United States Patent
Hirth et al.

(10) Patent No.: US 11,512,620 B2
(45) Date of Patent: Nov. 29, 2022

(54) DEVICE FOR TREATING EXHAUST

(71) Applicant: Vitesco Technologies GMBH, Hannover (DE)

(72) Inventors: Peter Hirth, Rösrath (DE); Florian Rings, Lohmar (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 0 days.

(21) Appl. No.: 17/227,636

(22) Filed: Apr. 12, 2021

(65) Prior Publication Data

US 2021/0231041 A1  Jul. 29, 2021

Related U.S. Application Data

(63) Continuation of application No. PCT/EP2019/077574, filed on Oct. 11, 2019.

(30) Foreign Application Priority Data

Oct. 11, 2018  (DE) .................. 10 2018 217 438.5

(51) Int. Cl.
*F01N 3/20* (2006.01)
*F01N 3/28* (2006.01)

(52) U.S. Cl.
CPC .......... *F01N 3/2026* (2013.01); *F01N 3/2814* (2013.01); *F01N 2330/02* (2013.01)

(58) Field of Classification Search
CPC .. F01N 3/2026; F01N 3/2814; F01N 2330/02; H05B 2203/016; H05B 3/06
USPC ....................................... 422/174
See application file for complete search history.

(56) References Cited

U.S. PATENT DOCUMENTS

| 5,149,508 A * | 9/1992 | Bullock ............. H05B 3/12 422/174 |
| 5,411,711 A | 7/1995 | Swars |
| 9,049,750 B2 | 6/2015 | Ishihara et al. |
| 9,131,535 B2 | 9/2015 | Yoshioka et al. |
| 9,732,651 B2 | 8/2017 | Sugiyama |
| 9,815,024 B2 | 11/2017 | Kasahara et al. |
| 2010/0089036 A1 | 4/2010 | Hodgson |

(Continued)

FOREIGN PATENT DOCUMENTS

| CN | 103079679 A | 5/2013 |
| DE | 4243904 A1 | 6/1994 |
| DE | 102015111913 A1 | 2/2016 |

(Continued)

OTHER PUBLICATIONS

International Search Report and Written Opinion dated Jan. 27, 2020 from corresponding International Patent Application No. PCT/EP2019/077574.

(Continued)

*Primary Examiner* — Tom P Duong

(57) ABSTRACT

A device for treating exhaust gases which is designed for electrically contacting a plurality of conductor tracks, which are arranged within an interior space that is surrounded by an outer wall of the device, through the outer wall. One or more electrodes which may be electrically contacted through the outer wall are arranged in the interior space, each of which electrodes electrically contacts two or more of the conductor tracks in the interior space.

10 Claims, 3 Drawing Sheets

(56) References Cited

U.S. PATENT DOCUMENTS

2016/0032806 A1* 2/2016 Sugiyama ............. F01N 3/2828
422/174

FOREIGN PATENT DOCUMENTS

| | | |
|---|---|---|
| EP | 0677649 A1 | 10/1995 |
| EP | 2175115 A1 | 4/2010 |
| JP | 2013198887 A | 10/2013 |
| JP | 2015203325 A | 11/2015 |
| WO | 9202714 A1 | 2/1992 |

OTHER PUBLICATIONS

Chinese Office Action dated Mar. 4, 2022 for corresponding Chinese Patent Application No. 201980066474.7.
Japanese Office Action dated May 16, 2022 for corresponding Japanese patent application No. 2021-519781.

\* cited by examiner

DEVICE FOR TREATING EXHAUST

CROSS-REFERENCE TO RELATED APPLICATIONS

This application claims priority to PCT Application PCT/EP2019/077574, filed Oct. 11, 2019, which claims priority to German Patent Application No. DE 10 2018 217 438.5, filed Oct. 11, 2018. The disclosures of the above applications are incorporated herein by reference.

FIELD OF THE INVENTION

The present invention relates to a device for treating exhaust gases which is designed for electrically contacting a plurality of conductor tracks, which are arranged within an interior space that is surrounded by an outer wall of the device, through the outer wall.

BACKGROUND OF THE INVENTION

Devices of this kind are known in principle, for example from EP 2 175 115 A1. The device for treating exhaust gases disclosed there has a sensor film which is embodied with a conductor element. A housing of the device has an opening for contacting the conductor element. In embodiments, provision is made to use the opening for contacting a plurality of conductor elements. The device has, on an outer surface of the housing, a metal sleeve which is arranged around the opening, for example with a gas-tight weld seam. The sleeve is lined with an insulation on the inside and securely receive an electrode for contacting the conductor element. The intention is therefore also in particular to ensure that no exhaust gas passes through the sleeve to the outside.

The prior art likewise discloses electrically heatable catalytic converters which have metallic sheet layers which are attached to a supporting substrate in an electrically insulated manner.

Electrically heatable carrier substrates which are embodied by an insulated heating conductor at the end sides of a honeycomb body of the device, which honeycomb body is arranged in the interior space, are also known.

A further known way of heating a substrate involves providing as large a portion of an inner catalytic converter surface as possible by use of conductor tracks which are applied to a smooth/corrugated layer of the device. Almost the entire carrier volume is electrically heated by the conductor tracks.

Some problems are observed in the case of conventional heatable catalytic converters. For example, the entire catalytic converter surface may not be heated in some cases. For 48-volt applications, resistances that are higher than usual are sometimes required and sometimes these cannot be technically implemented in the case of small substrate sizes since a minimum material length of the substrate has to be available.

Furthermore, problems may arise when inserting an insulated heating conductor. Since the heating conductor is insulated, temperature distribution may be relatively poor. In addition, closed cells may occur in the region of the heating conductor or an increased counterpressure may also occur.

Finally, problems may also arise when heating relatively large catalytic converter surfaces. Electrical contacting by way of leading out each individual conductor track of heating elements through the outer wall of the device may be very complicated. Furthermore, a thermomechanically stable carrier film coating is often associated with a great degree of process complexity. The leaktightness of the device, for example with respect to escaping exhaust gases, can likewise be adversely affected by leading out the large number of individual electrical contacts.

SUMMARY OF THE INVENTION

An object of the invention is to provide a device for treating exhaust gases which is improved over the prior art. The intention is, in an embodiment, to simplify the power supply to the conductor tracks through the outer wall.

The object of the invention is achieved by the device for treating exhaust gases of the kind mentioned at the outset, in which one or more electrodes which is electrically contacted through the outer wall are arranged in the interior space, each of which electrodes electrically contacts two or more of the conductor tracks in the interior space.

In an embodiment, a plurality of conductor tracks in the interior space are electrically contacted by the same electrode. Therefore, it is not necessary to provide a separate electrode for electrical contacting purposes for each conductor track. Therefore, the power supply is simplified. Furthermore, costs are reduced because the number of electrodes is reduced. The space requirement in the interior space may also be reduced owing to the reduced number of electrodes, and therefore the device is constructed to be more compact. Similarly, the design of the device is simplified if a plurality of conductor tracks are electrically contacted at the same electrode and therefore virtually at the same location in the device.

Various embodiments of the invention are also described herein.

The outer wall has an opening in order to electrically contact the plurality of conductor tracks, which are arranged within the interior space, through the outer wall. In an embodiment, the opening is arranged in a projection which protrudes outward from the interior space and is integrally formed with the outer wall. Therefore, a weld seam known from the prior art between the outer wall and the metal sleeve which is separate from it is dispensed with. The weld seam may constitute, for example, a potential leakage point for exhaust gases to the outside. Owing to the integrally formed projection, which replaces the sleeve, the separate sleeve and therefore the weld seam between the sleeve and the outer wall are superfluous. In addition, components, production steps and therefore also production costs are saved in this way.

In an embodiment, the projection is formed as a bead in the outer wall. A bead is incorporated into the outer wall in a simple manner, if the outer wall is of circular-cylindrical shape. The bead may have a width and a depth which permit convenient contacting of the conductor or conductors or semiconductor or semiconductors through the opening. The opening is arranged on a top side of the bead, but the opening may alternatively be arranged in a side wall of the bead in other embodiments. In an embodiment, the opening is a bore. The opening serves to contact a positive pole of one or more of the conductor tracks. However, in some embodiments, the opening serves to contact both the positive pole and also the negative pole of one or more of the conductor tracks. The bead has a top wall which connects the side walls and runs parallel to sections of the outer wall which adjoin the two side walls. In an embodiment, the side walls run substantially perpendicularly to the top wall. In an embodiment, the opening is formed in the top wall.

The projection, which in one embodiment is the bead, forms a cavity between the outer wall and a conductor track carrier within the interior space. The bead has two parallel side walls. The conductor track carrier is in this embodiment is a film. The cavity is formed in the interior space and is delimited by the side walls and the top wall of the bead and by the conductor track carrier. A cavity of this kind creates installation space for conveniently electrically contacting the conductor tracks.

In the cavity, an electrode is arranged between the opening and the conductor track carrier in order to contact the one or the plurality of conductor tracks. Therefore, the installation space which is created by the cavity is used. In an embodiment, one or the plurality of electrodes which is electrically contacted through the outer wall are arranged in the cavity, each of which electrodes electrically contacts two or more of the conductor tracks in the interior space.

If a plurality of electrodes are provided, two or more of the electrodes are electrically contacted through the same opening in the outer wall, wherein the opening is arranged radially in the outer wall above a region of the interior space in which the conductor tracks are contacted. Therefore, the number of openings may be reduced, and this may have a positive effect on the leaktightness of the device and on the production costs. However, in other embodiments, a separate opening is provided for each electrode for the purpose of electrically contacting the plurality of electrodes, so that each electrode may then be electrically contacted through the outer wall through an opening which is associated with the electrode.

In an embodiment, the electrode is designed such that a cross section of the electrode, that is to say a material thickness, is adapted in connection with the ends of the one or the plurality of conductor tracks. This ensures a constant current density within the electrode. Otherwise, a decreasing/increasing current density may lead to undesired cold/hot spots. The required change in the material thickness is dependent on a current consumption of the respective conductor track. Therefore, the cross section of the electrode varies in sections depending on the current consumption of the conductor track respectively contacted there. In the radial direction of the outer wall, the electrode has a thickness which is matched to the expected current flow. The electrode in an embodiment is thicker by more than a factor of 2, in another embodiment thicker by more than a factor of 3, an in another embodiment thicker by more than a factor of 4, in yet another embodiment thicker by more than a factor of 5, at its thickest point than at the thinnest point. Therefore, a substantially larger current flow may be managed at the thickest point than at the thinnest point, without a significant temperature difference occurring.

The electrode is designed as a busbar which extends along at least one section of the outer wall in order to contact a plurality of the conductor tracks. Therefore, a large number of conductor tracks may be contacted by a single electrode, so that a separate electrode is not required for each conductor track. In some embodiments, the electrode is designed as a strip-like busbar. The busbar extends along at least one section of the projection, which in one example is the bead. If the electrode is designed as a busbar, a plurality of conductor tracks may be easily electrically contacted via the electrode in a simple manner because the electrode provides enough space for this along its direction of extent. The electrode may therefore be embodied as a busbar when a plurality of conductor tracks are intended to be contacted by the electrode. The busbar is bent with the same bending radius as the outer wall, so that the strip is designed to follow the outer wall in the interior space substantially at a constant distance in a circumferential direction. A passage area of the opening is greater than an areal extent of the electrode with respect to an area which faces the interior space. In an embodiment, the extent of the opening in the circumferential direction of the outer wall is greater than a length of the electrode in its direction of extent, such as if the electrode is embodied as a busbar. Therefore, the electrode is easily inserted into the interior space through the opening.

In alternative embodiments, the electrode is embodied as a cable arrangement which has an input-end conductor for electrical contacting through the outer wall and a large number of output-end conductors for electrically contacting a plurality of the conductor tracks in the interior space. The cable arrangement therefore branches the input-end conductor to the plurality of output-end conductors. There are just as many output-end conductors as there are conductor tracks to be electrically contacted in the interior space.

The length of the electrode is greater than or equal to half a radial circumference of the outer wall, if the outer wall is of circular-cylindrical shape. The minimum length of the electrode is $L_{min}=0.5*\pi*D$, where D represents the diameter of the circular-cylindrical outer wall. The electrode is formed from an electrically conductive material which has a resistivity p which lies between 0 and 3 $(Ohm*mm^2)/m$. $\rho$ is $\leq 1.5$ $(Ohm*mm^2)/m$. Therefore, good electrical conductivity of the electrode is achieved.

In an embodiment, electrode is fastened to the outer wall by one or more electrically insulating supports.

In some embodiments, the electrically insulating supports are embodied as support pins. In some embodiments, the electrically insulating supports are embodied as an electrically insulated solder connection to the outer wall, in between the electrode and the outer wall. The support is embodied as a support pin. A plurality of support pins, which are arranged at the same distance from one another along a direction of extent of the electrode, in an embodiment two to eight support pins, in one embodiment five, may be provided. The support pin has two pin portions which are electrically insulated from one another. In an embodiment, a first pin portion is coaxially fixedly received in the second pin portion and insulation material for electrical insulation is inserted between the two pin portions. The first pin portion is then fastened to the outer wall and the second pin portion is fastened to the electrode, or vice versa. Therefore, a stable mechanical connection between the electrode and the outer wall is achieved and undesired electrical contacting between the electrode and the outer wall is prevented. In alternative embodiments, one or more of the electrically insulating supports is/are respectively not embodied as a support pin, but rather as an electrically insulated solder connection to the outer wall, in between the electrode and the outer wall. Some embodiments make provision for one or more of the electrically insulating supports to be embodied as a support pin and at the same time for one or more further electrically insulating supports to be embodied as an electrically insulated solder connection to the outer wall, in between the electrode and the outer wall.

In some embodiments, a plurality of electrically conductive contact regions are provided next to one another on the electrode. In an embodiment, each case one of the contact regions is associated with in each case one of a plurality of conductor tracks for electrical contacting. An insulating region is in one embodiment respectively interposed between the plurality of contact regions on the electrode. This makes it possible to limit electrical contacting only to the contact regions and to place contact areas of the conductor tracks in the interior space in a manner bearing or abutting areally against the contact regions of the electrode. Other elements in the interior space then bear or butt areally against the insulating regions of the electrode, without being electrically contacted by the electrode from outside the device. This allows a compact construction of the device. The electrode is embodied as a busbar and rectangular contact regions alternate with rectangular insulating regions along the direction of extent of the busbar. It is expedient to provide just as many contact regions as conductor tracks to be contacted.

In embodiments, wound smooth layers, which alternate with wound corrugated layers, are arranged in the interior space in a known manner. At least one of the smooth layers is, in an embodiment, the conductor track carrier. In an embodiment, at least two of the smooth layers are the conductor track carriers and each carry a conductor track that is to be contacted. In order to achieve the desired electrical contacting of the conductor tracks and to avoid undesired electrical contacting of the corrugated layers, the smooth layers and the corrugated layers may be arranged such that only the non-insulated contact areas of the smooth layers are in contact with the electrically conductive contact regions of the electrode. All of the elements in the interior space that are not to be electrically contacted are then in contact at most with the insulating regions of the electrode, so that undesired electrical contacting is avoided.

In an embodiment, precisely one electrical bushing passes through the opening and is electrically connected to the electrode. The electrical bushing is arranged to electrically contact the electrode from outside the outer wall through the opening. In other words, precisely one electrical bushing is electrically connected to all of the conductor tracks to be contacted via the electrode. Therefore, the connection complexity to outside the outer wall is reduced because a single bushing electrically contacts a plurality of conductor tracks via the electrode. An electrical bushing is a bolt, which in an embodiment is a cylindrical bolt. The electrical bushing has a diameter of 3-15 mm, and in one embodiment is 8 mm. The electrical bushing is designed to conduct a current of between 10-500 amperes, which in some examples is more than 200 amperes and/or equal to or less than 350 amperes, without heating up to a noticeable extent. The electrical bushing includes a bushing conductor, a bushing sleeve and a bushing insulation which electrically insulates the bushing sleeve from the bushing conductor. The bushing insulation radially surrounds the bushing conductor and has a thickness of 0.5-1.5 mm. The diameter of the electrical bushing corresponds substantially to a diameter of the opening, so that the electrical bushing is inserted into the opening with an accurate fit.

In embodiments, precisely two electrical bushings pass through the opening, wherein one of the electrical bushings is the electrical bushing that contacts the electrode and the other is a further electrical bushing which contacts a further electrode. The electrode electrically contacts the positive pole of the conductor track. The further electrode electrically contacts the negative pole of the conductor track.

In some embodiments which have a plurality of electrodes, such as the electrode and the further electrode, provision is made, for contacting each electrode, for in each case precisely one electrical bushing to pass through the outer wall and to be electrically connected to the respectively associated electrode in order to electrically contact the respectively associated electrode through the outer wall. Therefore, precisely one electrical bushing for each electrode is sufficient for electrical contacting, so that the number of electrical bushings through the outer wall is reduced.

The projection receives a layer stack, in between the outer wall and the conductor track carrier, and in an embodiment is in the cavity. The electrode is arranged in the layer stack. In an embodiment, the electrical bushing penetrates the layer stack to a penetration depth in order to electrically contact the electrode.

An electrically insulating insulation layer is in an embodiment fitted in the cavity, as a constituent part of the layer stack adjoining the outer wall. The insulation layer may be applied by one of the group consisting of CVD/PVD coating, aerosol deposition and flame spraying or a further suitable coating method. The insulation layer has a thickness which is matched to an expected maximum voltage that is to be contacted in order to form a suitable insulation resistance. A metallization layer is applied adjoining the insulation layer by vapor deposition of a thin layer. A first solder layer is fitted adjoining the metallization layer. The electrode is fitted adjoining the first solder layer. In embodiments, the electrode is applied by screen printing or the like. A second solder layer is fitted adjoining the electrode adjoining each contact region. The second solder layer furthermore adjoins the conductor track that is to be electrically contacted, which conductor track is fitted to the conductor track carrier. In an embodiment, the layer stack is therefore formed, in a sequence starting from the outer wall toward the conductor track carrier, of the insulation layer, the metallization layer, the first solder layer, the electrode and the second solder layer.

In an embodiment, the electrode is connected in a materially bonded manner to the metallization layer via the first solder layer and/or to the conductor track via the second solder layer, such as by hard-soldering, or by a soldering agent, such as a nickel-, iron-, silver- or platinum-based solder or the like.

In an embodiment, the layer stack has a cutout, which partially extends into the layer stack, for the electrical bushing to the penetration depth, so that the electrical bushing electrically contacts the first solder layer in order to electrically contact the electrode that is electrically contacted with the first solder layer. In some embodiments, the cutout therefore passes through the insulation layer and the metallization layer. The insulation layer and the metallization layer therefore radially surround the electrical bushing, while the electrical bushing axially butts against the first solder layer by way of one end of the electrical bushing. A connection to a power source, for example a cable or a terminal, may be provided on the electrical bushing at a further end which is situated opposite the first-mentioned end and protrudes out of the outer wall.

In an embodiment, the device is designed for electrically contacting the first pole of the conductor track in the interior space through the opening. The device has, in the outer wall, a further projection with the further opening in order to electrically contact the second pole of the conductor track in the interior space. The further opening is arranged in a further projection which protrudes radially outward and is integrally formed with the outer wall. The further projection may be designed as a further bead and designed according to one of the embodiments of the above-described bead. The first pole is the first pole of the conductor track which is arranged on the smooth layer which is a conductor track carrier. The second pole is the second pole of the conductor track which is arranged on the smooth layer. The first pole is the positive pole. The second pole is the negative pole.

The second pole may alternatively also be electrically contacted via the outer wall, also called the device jacket. The termination of the smooth layer is then provided with solder for hard-soldering, which is suitable for connecting the conductor track and the outer wall to one another in a materially bonded manner, for contacting the negative pole. Therefore, a fixed contact between the outer wall and the negative pole of the conductor track may be ensured. Some embodiments make provision for the electrode to contact the first pole. Some embodiments make provision for a further electrode, which may be designed like embodiments of the electrode, to contact the second pole.

In an embodiment, the device has the electrode and the further electrode in the interior space and is designed for electrically contacting the electrode through the outer wall in order to electrically contact in each case a first pole of two or more of the conductor tracks and is designed for electrically contacting the further electrode through the outer wall in order to electrically contact in each case a second pole of the two or more of the conductor tracks. The electrode is received in the projection and the further electrode is received in the further projection. In some embodiments, the electrode and the further electrode are received in a common projection and/or are electrically contacted through the same opening in the outer wall. A positive electrical bushing electrically contacts the electrode. In an embodiment, a negative electrical bushing electrically contacts the further electrode.

In an embodiment, the electrode and the further electrode are arranged parallel to one another in the interior space and extend at a substantially constant distance from the outer wall. Therefore, the first pole and the second pole may each be electrically contacted immediately next to one another in a very compact manner.

In an embodiment, the device has, in the interior space, one or more of the conductor track carriers which each carry one of the conductor tracks. In each case one of the conductor tracks is arranged on a surface of a respective conductor track carrier and an electrically insulating insulation coating, which is interrupted on a contact area of the conductor track for electrically contacting the conductor track in order to electrically contact the conductor track through the outer wall, is formed on the surface and the conductor track. In an embodiment, the insulation coating also extends between the surface of the conductor track carrier and the conductor track in order to electrically insulate the conductor track carrier from the conductor track.

At least one of the conductor tracks is designed for operating a heater which is arranged in the interior space. The heater in one embodiment is the conductor track which is arranged on the smooth layer. In an embodiment, the conductor track on the smooth layer is coated with the electrically insulating insulation coating, wherein a cutout is provided in the insulation coating in order to expose the contact area of the conductor track at which the conductor track is electrically contacted by the electrode. A separate cutout is provided for each contact area of the conductor track for each pole of the conductor track. The cutouts are arranged adjacent to ends of the smooth layer since the ends generally constitute terminations of the smooth layers which bear against the electrode in the assembled state. The conductor track, as a heater, runs in a meandering manner or in a zigzag manner over the conductor track carrier. A gap, which is additionally free of the conductor track and which likewise serves for insulation, is provided between the ends of the insulation coating and the ends of the conductor track carrier of the film of the smooth layer. The region of the gap, at an end side of the film, is arranged in order to butt against the outer wall of the device from the inside in the assembled state. Therefore, an electrical short circuit of the conductor track carrier with the electrode or else with an inner side of the outer wall is prevented.

In some embodiments, the device is a catalytic converter, such as a catalytic converter which is areally heated. In these embodiments, a large number of heating devices, which are embodied as conductor tracks on the conductor track carriers, such as the smooth layers, often have to be electrically contacted from outside the device through the outer wall. The present invention may therefore provide sealing which is improved or simplified.

In an embodiment, a plurality of conductor track carriers, in one embodiment a plurality of films, a plurality of smooth layers and/or a plurality of corrugated layers, form a layer package in the interior space. In an embodiment, the conductor track carriers are arranged in a wound arrangement in the interior space. In an embodiment, smooth layers and corrugated layers are arranged alternately and respectively adjacent smooth layers and corrugated layers are in contact. The layer package is wound in a known S-shape and the layer package is received in the interior space in such a way that the direction of extent of a winding axis of the layer package corresponds to a direction of extent of the axial extent of the outer wall. In embodiments, the layer package is tilted, so that it forms a parallelogram as seen from the end side. Therefore, in a non-rolled up and therefore flat form of the stacked layers of the layer package, the layers are shifted in parallel in relation to one another, so that the surface of the end side that is formed by the edges of the plurality of smooth layers and/or corrugated layers assumes the shape of a parallelogram. A length of the layer termination in the wound shape may then be shortened depending on an angle of tilt. This makes it possible to keep the contact areas of the conductor tracks and the associated contact regions of the electrode small or else to shorten the electrode if the electrode is designed as a busbar. In some examples, the angle of tilt is greater than 15°, such as greater than 30°. In an embodiment, the angle of tilt is less than 90°, and may be less than 80°. The angle of tilt in in some examples lies between 40° and 80°. In other embodiments, the angles of tilt may be 50° and 75°. In some embodiments, the layer termination generally has a length of less than 180°, and in some examples is less than 160°, in other examples is less than 120°, and in other examples is less than 100°, and in an embodiment is preferably less than 90°, with respect to a radial circumference of a circular-cylindrical outer wall. Some examples of layer terminations have lengths of between 150° and 140°, and in some examples are approximately 141°, or of 110° to 100°, and in other examples are approximately 106°, with respect to the radial circumference of the circular-cylindrical outer wall.

One or more of the insulation layer, the insulating region and the insulation coating are formed from an electrically insulating material which is resistant to high temperatures, and is resistant to high temperatures up to a temperature of 1000° C. The material has an oxidic composition and may be an aluminum oxide, a titanium oxide, a zirconium oxide or the like. In some examples, a material has a porosity of preferably <1%, in other examples, a porosity of <0.1%, and in yet other examples, a porosity of 0%. In some embodiments, the material is provided with a thickness of between 100 nm and 10 μm. The thickness of one or more of the insulation layer, the insulating region and the insulation coating therefore lies between 100 nm and 10 μm. It goes without saying that the insulation layer, the insulating region and the insulation coating compared with one another do not all have to be formed from the same materials with respectively the same thicknesses and porosities and different materials may also be combined with one another within each of the insulation layer, the insulating region and the insulation coating, provided that the desired electrically insulating effect is achieved in each case.

The device according to the invention is produced by the following steps: First, the opening is made in the outer wall above the layer termination of the conductor track carrier, wherein the length of the layer termination is predetermined in order to be able to suitably select the dimensions of the opening. Then, a corresponding matrix, which is provided with conductor tracks, is pressed in. Thereafter, the electrodes are provided with the insulation regions and the insulation coating is fitted on the layers, and the end sides of the layers are insulated with ceramic insulation. The electrode for contacting the positive pole is then fitted to the outer wall in an electrically insulated manner by support pins. It is that the negative pole is then contacted either directly via the outer wall or a further electrode. Both the electrode and the further electrode are arranged at least in sections in a projection, such as a bead, of the outer wall. Then, the device is sealed off in a gas-tight manner by a sealing wall which surrounds the outer wall, wherein the sealing wall is provided with passages, which are sealed off in a gas-tight manner, for the electrical bushings to the electrode and the further electrode. Finally, the electrical bushings are connected to the electrode and the further electro, if present, through the outer wall and through the sealing wall.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Exemplary embodiments of the invention, to which the invention is not limited however, will be described below with reference to the appended schematic figures, in which.

Reference signs have been inserted in the following detailed description of embodiments, which relates to the appended Figures, and in order to improve readability. The reference signs are not intended to have any limiting effect. Furthermore, all features which are mentioned in the general part of the description and in the following detailed description may also be combined with one another between the illustrative, exemplary embodiments in order to form new exemplary embodiments according to the invention, provided that the combined features are not technically mutually exclusive or the combination of the features is not explicitly excluded.

DETAILED DESCRIPTION OF THE PREFERRED EMBODIMENTS

The following description of the preferred embodiment(s) is merely exemplary in nature and is in no way intended to limit the invention, its application, or uses.

Figure 1:
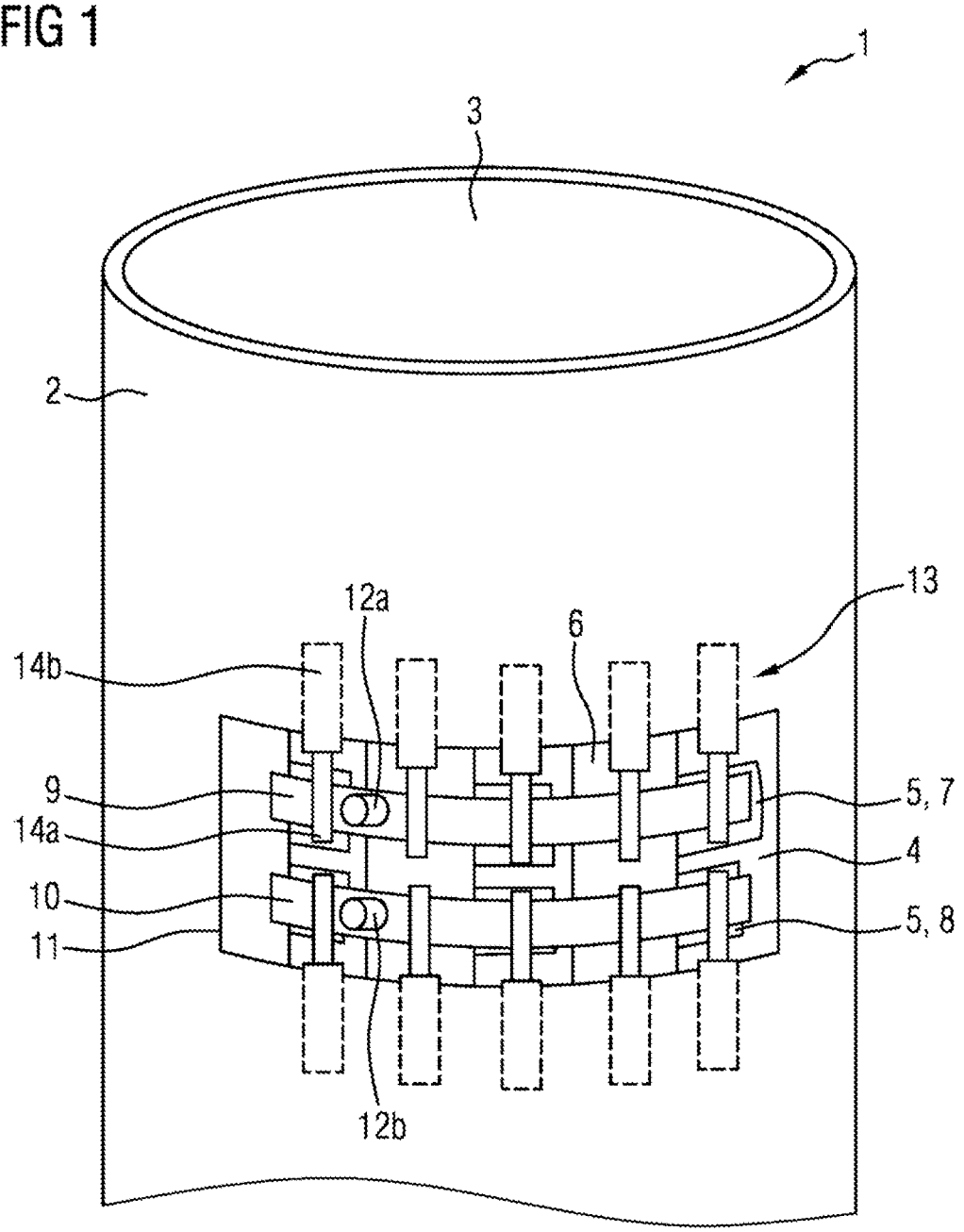
FIG. 1 shows a schematic perspective side view of a first embodiment of a device for treating exhaust gases.

FIG. 1 shows a schematic perspective side view of a first embodiment of a device 1 for treating exhaust gases. The device 1 is generally a catalytic converter. The device has an outer wall 2. The outer wall 2 surrounds an interior space 3. Furthermore, the device has three conductor track carriers 4, which each carry a conductor track 5, in the interior space 3. Therefore, a plurality of conductor tracks 5, here three by way of example, are arranged within the interior space 3. The conductor track carriers 4 are films and, in this case, smooth layers of the device 1. A corrugated layer 6, which does not carry any conductor tracks 5, is respectively interposed between two conductor track carriers 4. Conductor track carriers 4 and corrugated layers 6 form a layer package rolled in an S-shape. Conductor track carriers 4 and corrugated layers 6 of the device are more clearly identifiable further below in FIGS. 3-5. In addition, the conductor track carriers 4 are described more precisely further below with reference to FIG. 3. Each of the three conductor tracks 5 respectively has a first contact area 7 and a second contact area 8. In order to simplify the illustration, only one of the conductor track carriers 4, one of the conductor tracks 5, one of the corrugated layers 6, one of the first contact areas 7 and one of the second contact areas 8 are provided with reference signs in each case, but the periodic repetition of these elements in FIG. 1 is obvious.

The device 1 is designed for electrically contacting the conductor tracks 5 through the outer wall 2. For this purpose, as shown in FIG. 1, a plurality of electrodes 9,10 which may be electrically contacted through the outer wall 2 are arranged in the interior space 3, in this example an electrode 9 and a further electrode 10, each of which electrically contacts all three of the conductor tracks 5 in the interior space 3. Therefore, a plurality of the conductor tracks 5 are electrically contacted via each of the electrodes 9,10. The electrodes 9,10 are each designed as a busbar in order to contact the three conductor tracks 5. The two electrodes 9,10 may be electrically contacted through the same opening 11 in the outer wall 2. The opening 11 is arranged radially in the outer wall 2. The opening 11 is arranged above a region of the interior space 3 in which the conductor tracks 5 may be contacted, specifically above the first contact areas 7 and the second contact areas 8 of the conductor tracks 5. The first contact area 7 is a first pole in each conductor track 5, while the second contact area 8 is a second pole in each conductor track 5. The device 1 is therefore designed for electrically contacting the electrode 9 through the outer wall 2 in order to electrically contact in each case a first pole of the three conductor tracks 5 and is designed for electrically contacting the further electrode 10 through the outer wall 2 in order to electrically contact in each case a second pole of the three conductor tracks 5.

For contacting each electrode 9,10, in each case precisely one electrical bushing 12a,b passes through the outer wall and is connected to the respectively associated electrode 9,10 in order to electrically contact the associated electrode 9,10 through the outer wall. The two electrical bushings 12a,b in the first exemplary embodiment according to FIG.

1 both run through the same opening 11 in order to electrically contact the respectively associated one of the two electrodes 9,10. For reasons of illustration, it is not shown that the outer wall 2 is also surrounded by a sealing wall which seals off the outer wall 2, which has the opening 11 to the interior space 3, from the environment. In this closed sealing wall, bushing bores which are sealed off in a gas-tight manner are provided for the electrical bushings 12a,b. Therefore, the opening 11 may be of a size which, during production or maintenance, allows easy access to the interior space 3 and, in spite of this, good leaktightness of the device 1 is achieved.

As shown in FIG. 1, each of the electrodes 9,10 is fastened to the outer wall 2 by a plurality of electrically insulating supports 13. In the present exemplary embodiment, the supports 13 are in each case five support pins. The support pins are mechanically connected in a materially bonded manner to the outer wall 2 and in each case one of the two electrodes 9,10. The supports 13 are designed for electrically insulating the outer wall 2 from the respective electrode 9,10. For this purpose, each support pin has two pin portions 14a,b which are electrically insulated from one another. A first pin portion 14a is coaxially fixedly received in a second pin portion 14b. An insulation material (not shown) for electrical insulation is inserted between the first pin portion 14a and the second pin portion 14b, so that the first pin portion 14a is electrically insulated from the second pin portion 14b. The first pin portion 14a is manufactured from a metal and welded to a side of the electrode 9 that faces away from the interior space 3. The second pin portion 14b is manufactured from the metal and welded to an inner side of the outer wall 2. Therefore, in spite of the mechanical connection via the support pin, the electrode 9 is electrically insulated from the outer wall 2 to which the electrode 9 is fastened. The electrode 9 and the further electrode 10 are arranged parallel to one another in the interior space 2.

Figure 2:
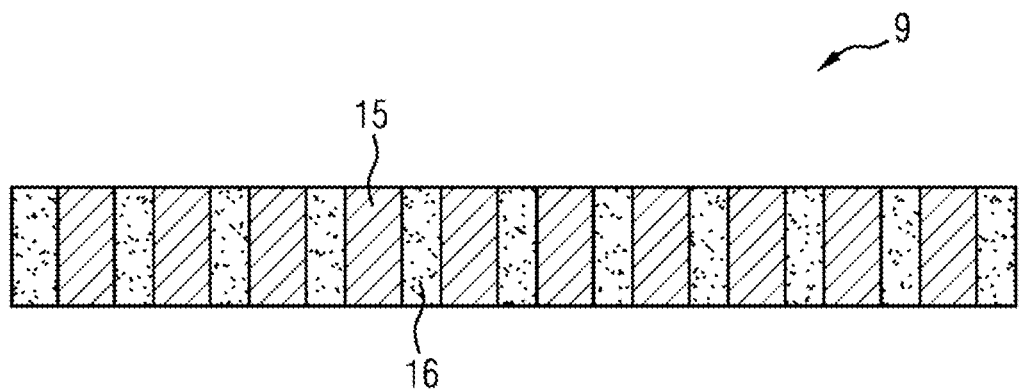
FIG. 2 shows, by way of example, a plan view of an electrode according to a second embodiment of the device.

FIG. 2 shows, by way of example, a plan view of the electrode 9 according to a second embodiment of the device 1. The plan view shows a side of the electrode 9 which faces the interior space 3. The electrode 9 is designed as a busbar, in this example as a strip-like busbar. A plurality of contact regions 15 are provided on the electrode 9. A plurality of insulating regions 16 are provided on the electrode 9. The insulating regions 16 are interposed between the contact regions 15, so that in each case one contact region 15 alternates with an insulation region 16 along the electrode 9. Here, ten contact regions 15 are provided by way of example, and therefore ten conductor tracks 5, which are arranged within the interior space 3, may be contacted by the electrode 9. If more or fewer conductor tracks 5 are to be electrically contacted, more or fewer contact regions 15 may, however, also accordingly be provided. In an embodiment, precisely one contact region 15 is associated with each conductor track 5 and the number of contact regions 15 provided on the electrode 9 corresponds to the number of conductor tracks 5 to be electrically contacted. Therefore, in each case three contact regions 15 are provided in the electrode 9 and the further electrode 10 according to the first exemplary embodiment from FIG. 1 in order to electrically contact the three conductor tracks 5. For reasons of simplicity, only one contact region 15 and only one insulation region 16, which is adjacent to the contact region 15, are provided with reference signs in FIG. 2.

Figure 3:
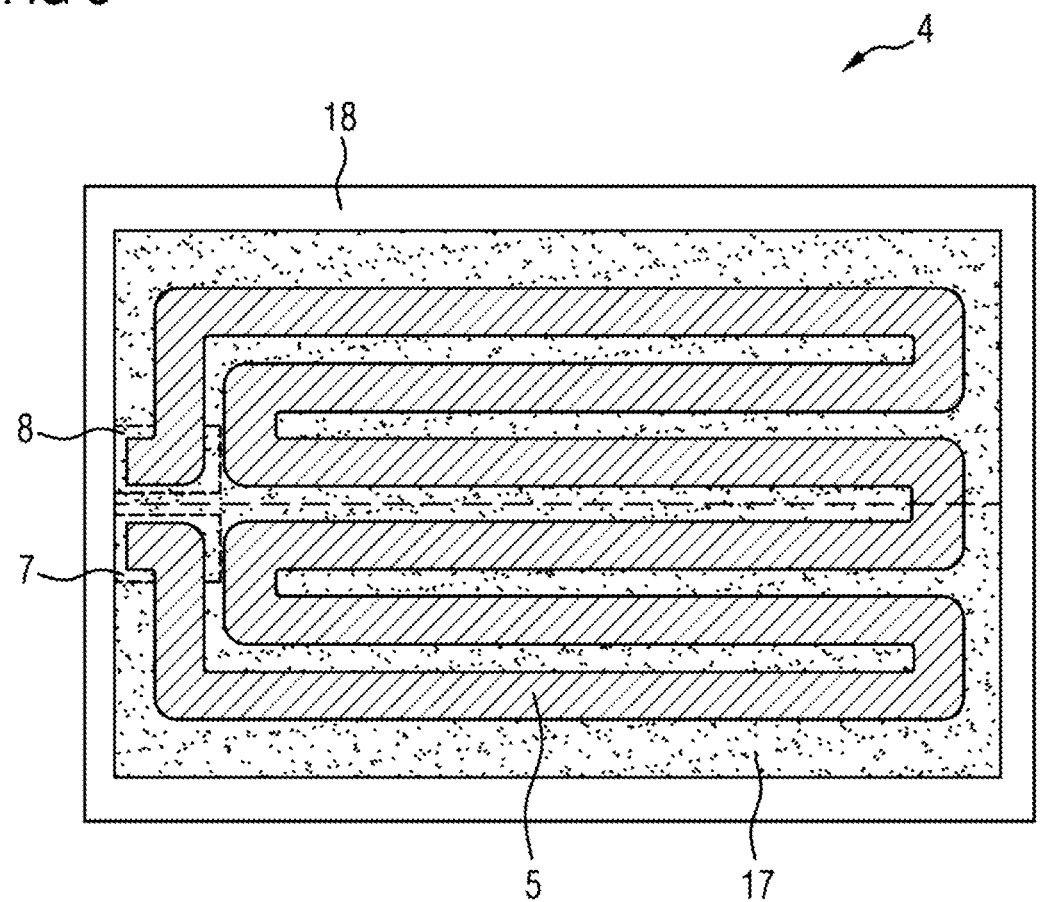
FIG. 3 shows a plan view of a conductor track on a conductor track carrier of the device according to the first embodiment from FIG. 1.

FIG. 3 shows a plan view of the conductor track 5 on a conductor track carrier 4 of the device 1 according to the first embodiment from FIG. 1. More precisely, FIG. 3 shows one of a plurality of conductor track carriers 4 which are installed in the device 1. The conductor track carrier 4 forms one of the smooth layers of the catalytic converter. The conductor track 5 is arranged on a surface of the conductor track carrier 4. The conductor track 5 runs in a meandering manner over the conductor track carrier 4. An electrically insulating insulation coating 17 is applied to the conductor track 5 and to the surface. The insulation coating 17 also extends between the conductor track carrier 4 and the conductor track 5 in order to electrically insulate the conductor track 5 from the conductor track carrier 4. The insulation coating 17 covers a large portion of the conductor track carrier 4. A gap 18 is left free between the edge of the insulation coating 17 and the edge of the conductor track carrier 4. Neither the insulation coating 17 nor the conductor track 5 are located in the gap 18. Therefore, the gap 18 may serve as additional electrical insulation, for example if the gap 18, in the state in which the conductor track carrier 4 is mounted in the device 1, butts for example against the electrode 9 or from the inside against the outer wall 2.

The first contact area 7 is formed at a first end region of the conductor track 5, which end region forms the positive pole of the conductor track 5. The electrically insulating insulation coating 17 is interrupted above the first contact area 7 of the conductor track 5 for electrically contacting the conductor track 5 in order to electrically contact the conductor track 5 through the outer wall 2. Therefore, the first contact area 7 is formed by way of a first recess being formed in the insulation coating 17, which recess exposes the first contact area 7 of the conductor track 4. The second contact area 8 is formed at a second end region of the conductor track 5, which end region forms a negative pole of the conductor track 5. The electrically insulating insulation coating 17 is interrupted above the second contact area 8 of the conductor track 5 for electrically contacting the conductor track 5 in order to electrically contact the conductor track 5 through the outer wall 2. Therefore, the second contact area 8 is formed by way of a second recess being formed in the insulation coating 17, which recess exposes the second end region. This ensures that electrical contacting of the conductor track 5 may take place only in the two end regions of the conductor track 5. One of the contact regions 15 of the electrode 9 is therefore arranged for being in electrical contact with the first contact area 7 in order to electrically connect the conductor track 5 through the opening 11 in the outer wall 2 via the electrical bushing 12a associated with the electrode 9. One of the contact regions of the further electrode 10 is additionally arranged for being in electrical contact with the second contact area 8 in order to electrically connect the conductor track 5 through the opening 11 in the outer wall 2 via the electrical bushing 12b associated with the further electrode 10. The device 1 is therefore designed for electrically contacting the first pole of each conductor track 5 and the second pole of each conductor track 5 in the interior space 3 through the opening 11. One electrical bushing 12a is a positive electrical bushing and the other electrical bushing 12b is a negative electrical bushing.

The conductor track 5 shown in FIG. 3 is designed for operating a heater which is arranged in the interior space 2. More precisely, the conductor track 5 is the heater here and has an electrical resistor, which heats the conductor track carrier 4 as current flows through the conductor track 5, between the first pole and the second pole. The smooth layer is therefore areally heated. Therefore, the device 1 is an areally heatable catalytic converter.

Figure 4:
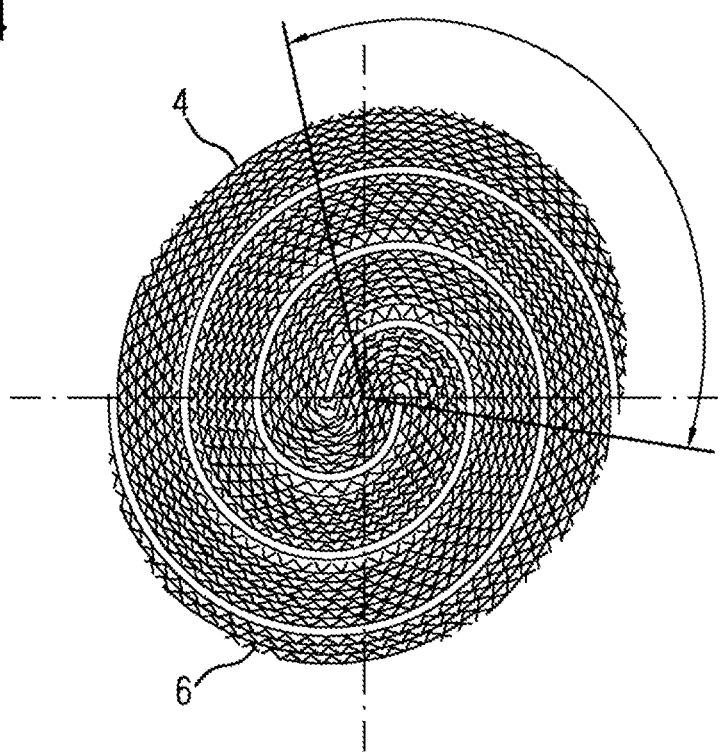
FIG. 4 shows a cross-sectional view along an axial viewing direction of the device according to the first embodiment.

FIG. 4 shows a cross-sectional view along the axial viewing direction of the device 1 according to the first embodiment. More precisely, FIG. 4 now shows the layer package of conductor track carriers 4 and corrugated layers 6 in an illustrative manner along a winding axis of the layer package. A winding of S-shape in accordance with FIG. 4 is used for the device 1 illustrated in FIG. 1. The direction of extent of the winding axis of the layer package corresponds to a direction of extent of the axial extent of the outer wall 2. The layer package is tilted so that, in the non-wound, flat state, it forms a parallelogram when viewed from the end side. The layers are therefore arranged in a manner displaced in relation to one another. A degree of displacement determines a length of a layer termination. Here, by way of example, the angle of tilt which may be measured at the non-wound layer package is 75° and the length of the layer termination is 120.6 mm or, expressed as the radial circumferential angle of the outer wall 2, 106.3°. Therefore, the respective first contact areas 17 of the conductor tracks 9 and the associated contact regions 18 of the electrode 11 are kept small or else the length of the electrode 11 may be kept short.

Figure 5:
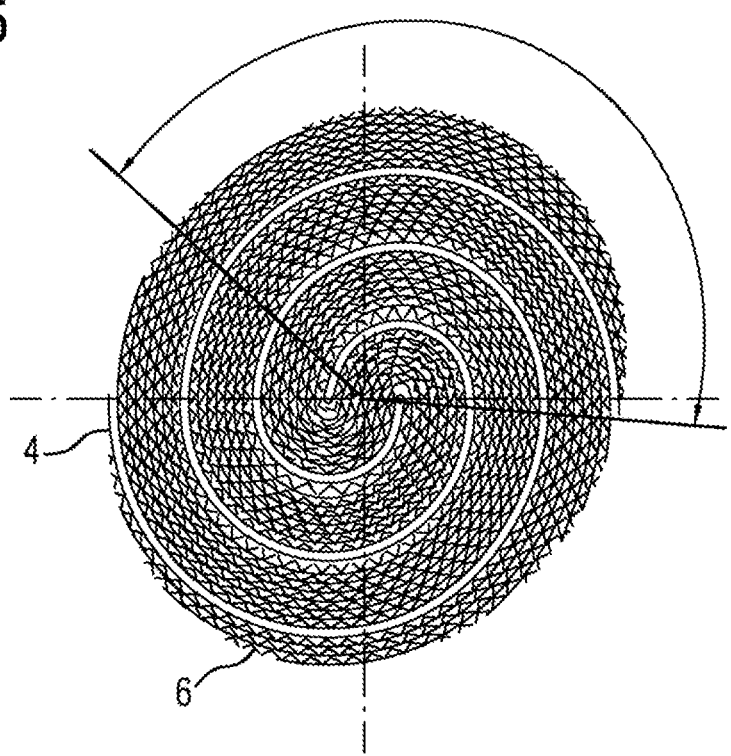
FIG. 5 shows a cross-sectional view along the axial viewing direction of the device according to a third embodiment.

FIG. 5 shows a cross-sectional view along the axial viewing direction of the device 1 according to a third embodiment. The figure shows a layer package including conductor track carriers 4 and corrugated layers 6 which has an alternative angle of tilt illustrated along a winding axis of the layer package. The winding of S-shape according to FIG. 5 is used for some embodiments of the invention that are not shown. It then simply replaces the winding according to FIG. 4, with adjustment of the electrode 9 and the further electrode 10 and further elements which are dependent on the length of the layer termination. The direction of extent of the winding axis of the layer package shown again corresponds to the direction of extent of the axial extent of the outer wall 2. The layer package is again tilted, so that, in the non-wound, flat state, it forms the parallelogram when viewed from the end side. The layers are therefore once again arranged in a manner displaced in relation to one another. Here, by way of example, the angle of tilt which is measured at the non-wound layer package is, however, 50° and the length of the layer termination is 160.7 mm or, expressed as the radial circumferential angle of the outer wall 2, 141.6°. Therefore, the layer termination is stretched over a greater distance. Further angles of tilt are possible, depending on the application.

The invention therefore allows areal heating elements, such as heating foils for example which have been inserted into a catalytic converter, to be contacted in a simplified manner. Conventionally electrically heatable catalytic converters which include metallic sheet layers which are arranged on a supporting substrate in an electrically insulated manner in embodiments that are not shown may be contacted in a comparable manner to the conductor tracks 5 shown. Therefore, both the positive and also the negative contacting point may be tapped off in the same radial position. The contacting of all contact areas 7, 8 of the conductor tracks 5 may therefore take place centrally by the electrode 9, for the positive poles, or the further electrode 10 for the negative poles of the conductor tracks 5. This results in a simple, central electrical connection of the conductor tracks 4 by the electrical bushing 12a,b, a catalytic converter which is areally heated by the conductor tracks 5. The result is increased accessibility and a smaller amount of required installation space.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A device for treating exhaust gases, comprising:
an outer wall surrounding an interior space;
a plurality of conductor tracks, which are arranged within the interior space;
a plurality of corrugated layers, at least one of the plurality of corrugated layers disposed between two of the plurality of conductor tracks; and
at least one electrode arranged in the interior space, the at least one electrode is electrically contacted through the outer wall, and the at least one electrode electrically contacts two or more of the plurality of conductor tracks.

2. The device of claim 1, the at least one electrode further comprising a busbar, wherein the busbar contacts the plurality of the conductor tracks.

3. The device of claim 1, further comprising one or more electrically insulating supports, wherein the at least one electrode is fastened to the outer wall by the one or more electrically insulating supports.

4. The device of claim 1, further comprising at least two electrodes which are electrically contacted through an opening in the outer wall, and the opening is arranged radially in the outer wall above a region of the interior space in which the conductor tracks are contacted.

5. The device of claim 1, further comprising at least one electrical bushing, the at least one electrical bushing passes through the outer wall and is electrically connected to the at least one electrode, such that the at least one electrical bushing is in electrical contact with the at least one electrode through the outer wall.

6. The device of claim 1, the at least one electrode further comprising:
a first electrode in the interior space, and the first electrode is electrically contacted through the outer wall in order to electrically contact in each case a first pole of two or more of the plurality of conductor tracks; and
a second electrode in the interior space, and the second electrode is electrically contacted through the outer wall in order to electrically contact in each case a second pole of the two or more of the conductor tracks.

7. The device of claim 6, wherein the first electrode and the second electrode are arranged parallel to one another in the interior space.

8. The device of claim 1, the device further comprising one or more conductor track carriers in the interior space, wherein the one or more conductor track carriers carries at least one of the plurality of conductor tracks.

9. The device of claim 8, further comprising:
a plurality of contact areas, each of the plurality of contact areas being part of a corresponding one of the plurality of conductor tracks; and
an electrically insulating insulation coating arranged on a respective surface of the one or more conductor track carriers except in an area of the plurality of contact areas, and the electrically insulating insulation coating is applied to the corresponding one of the plurality of conductor tracks;
wherein each of the plurality of conductor tracks is arranged on the respective surface of the one or more conductor track carriers.

10. The device of claim 1, wherein at least one of the conductor tracks is designed for operating a heater which is arranged in the interior space.

* * * * *